United States Patent [19]
Fienup et al.

[11] 3,712,534
[45] Jan. 23, 1973

[54] PRESSURIZED DOUGH CONTAINER

[75] Inventors: Wilbur G. Fienup, St. Louis, Mo.; James R. Henderson, Louisville, Ky.

[73] Assignee: Boise Cascade Corporation, Boise, Idaho

[22] Filed: April 21, 1969

[21] Appl. No.: 818,019

Related U.S. Application Data

[63] Continuation of Ser. No. 552,804, May 25, 1966.

[52] U.S. Cl. ................................. 229/51 BP, 99/172
[51] Int. Cl. ............................ B65d 17/00, B65d 3/26
[58] Field of Search.229/51 BP, 51 AS, 51 RT, 48 T, 229/48 S, 48 SN; 99/172

[56] References Cited

UNITED STATES PATENTS

| | | | |
|---|---|---|---|
| 2,793,126 | 5/1957 | Fienup | 99/172 |
| 2,793,127 | 5/1957 | Geist et al. | 99/172 |
| 2,800,267 | 7/1957 | O'Neil | 229/51 BP |
| 2,975,068 | 3/1961 | Fienup et al. | 99/172 |
| 3,144,193 | 8/1964 | Geist et al. | 229/51 |
| 3,237,364 | 3/1966 | Mack | 229/49 R |
| 3,267,633 | 8/1966 | Goodman | 206/78 B X |
| 3,397,834 | 8/1968 | Hanlon et al. | 229/51 BP |

*Primary Examiner*—Davis T. Moorhead
*Attorney*—Lawrence E. Laubscher

[57] ABSTRACT

Without limitation on the scope of the claims, this disclosure embodies a container of spirally wound laminated construction for holding pressurized dough products such as pre-leavened dough and the like wherein the laminations of the container are permanently adhered together in a manner to provide sufficient body wall stiffness to rupture along a pre-determined spiral rupture line upon application of only a moderate indenting force against the body wall, a specific embodiment including a dry bond type adhesive for adhering the layers together and the disclosure also embodying the method of opening a pressurized dough package by applying only moderate indenting force against the side wall of the container to rupture the same without peeling off any portion of the laminations.

3 Claims, 8 Drawing Figures

PATENTED JAN 23 1973 3,712,534
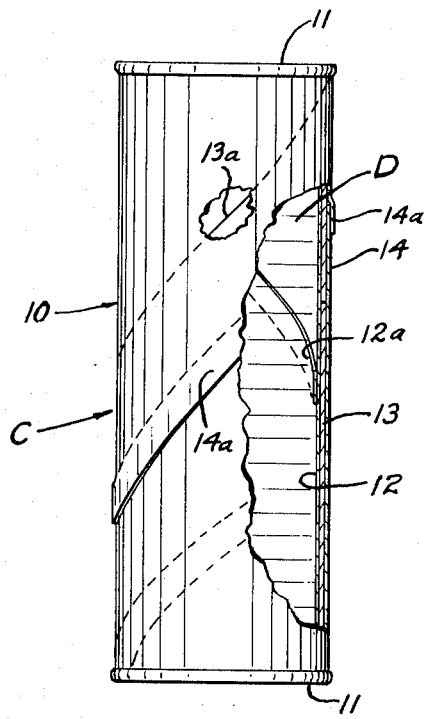
FIG. 1.
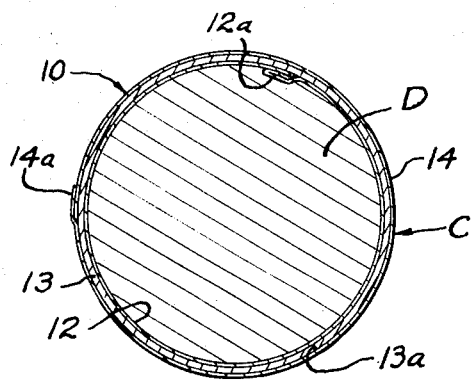
FIG. 2.
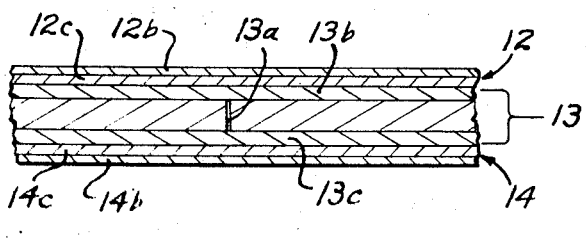
FIG. 4.
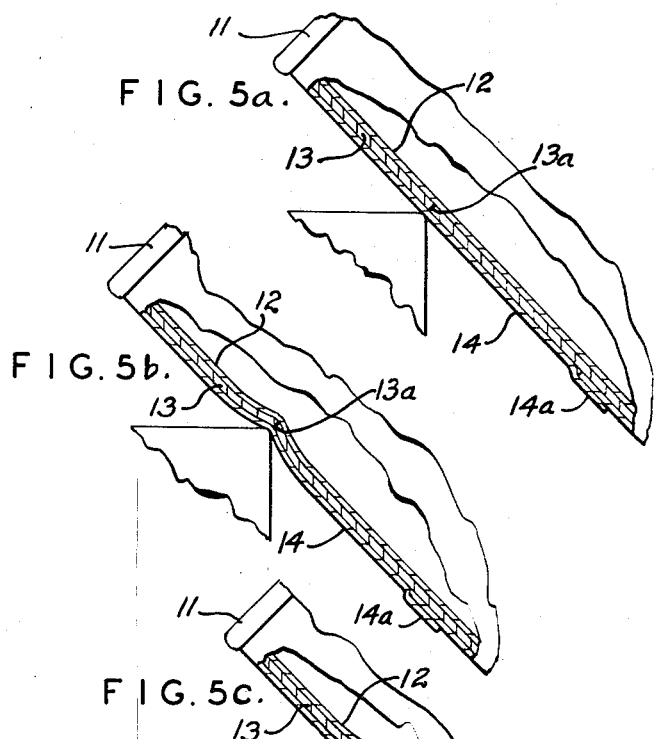
FIG. 5a.
FIG. 5b.
FIG. 5c.
FIG. 5d.
FIG. 3.
INVENTORS
WILBUR G. FIENUP
JAMES R. HENDERSON
John W. Adams
ATTORNEY

PRESSURIZED DOUGH CONTAINER

This invention relates to an improved method for opening pressurized dough containers and to a spirally wound container for holding dough products such as pre-leavened dough and the like and which is constructed to permit one-step easy opening without the need of any tools and without any pre-weakening of the container and is a continuation of application for U. S. Letters Patent Ser. No. 552,804, filed May 25, 1966.

This invention is an improvement over the invention disclosed and claimed in U.S. Pat. No. 2,975,068 which is assigned to the assignee hereunder and which embodies the basic concept of a one-step easy opening spirally wound container of the type which requires no initial pre-weakening step for opening (hereinafter referred to as "no-peel" type containers) and which has a spiral rupture line formed by the butt joint of the intermediate spirally wound body layer and held together only by the inner and outer layers glued to the respective inner and outer surfaces of the body layer. While this first "no-peel" container successfully confined the pressurized dough product and was relatively easy to open, some objections were raised to the opening characteristics in that excessive indenting force was required to be applied at the selected area of the side wall if struck on a straight edge, which has become the customary way for the housewife to open pressurized dough packages. In order to reduce the force required for opening this first "no-peel" container, impact against a protruding corner was required.

A number of prior art U.S. patents have been issued for packages for pressurized dough products such as Fienup et al. U.S. Pat. No. 2,793,126 and Geist et al. U.S. Pat. No. 2,793,127, and Geist et al. U.S. Pat. No. 3,144,193, all of which are assigned to the same assignee as the instant application. The containers disclosed in each of these patents as well as other prior art structures all require pre-weakening of the container such as by removal of at least a portion of the outer wrapper at the time of opening. This permits sufficient strength to be built into the container to facilitate manufacture of the container and confine the dough therein during packing, "proofing", shipping, handling and storage until it is desired to open the package. For convenience in this application, containers which require an initial pre-weakening step for opening will be referred to as "peel-open" containers. In the fiber can industry the outer layer or wrapper usually constitutes the printed label and therefore this outer wrapper will be frequently referred to herein as the "label".

The first "no-peel" container described above was developed in order to eliminate the initial pre-weakening step required for opening all "peel-open" type containers. Since the development of the first "no-peel" containers, employees of applicants' assignee have been constantly working to improve the opening characteristics of the "no-peel" type container in view of the fact that it was found to be somewhat inconvenient and objectionable to strike the container against a protruding corner. This was also somewhat objectionable in that a sharp protruding corner would sometimes penetrate into the dough and cause a slight permanent deformation of the pre-formed shape of this dough so penetrated.

The principal problem in producing a satisfactory "no-peel" type container is to provide a container which will satisfactorily hold the product and yet permit easy opening by the use of only moderate indenting force such as is applied by moderate impact against a straight edge thus eliminating the necessity for impact against a protruding corner. It is extremely important to keep in mind that in order for such a "no-peel" container to provide a contribution to the art, it must be substantially as easy to open by impact against a straight edge as is the present "peel-open" container on which an initial pre-weakening step has been performed.

Different types and weights of container materials were tried in attempting to produce a "no-peel" container which would have the required opening characteristics and yet would be sufficiently strong to confine the pressurized dough product. However, all of these experiments failed to produce the desired results. The containers which were sufficiently strong to hold the product were difficult to open. All spirally wound refrigerated dough containers manufactured by the fiber can industry have been constructed with water base or aqueous glues which include animal, dextrine, or resin bonding agents.

It has been known by those skilled in the art that adhesives other than water base glues are available but none has been used to any extent in the fiber can industry. The use of heat sealing polyethylene was tried experimentally by companies such as the Aluminum Company of America, as evidenced by its booklet entitled "Alcoa Dry-Bonding System for Composite Containers". These adhesives were generally known to produce stronger containers than the aqueous glues used by the industry but were generally more expensive and more difficult to use, and had not been used, prior to our invention, for adhesively connecting the layers of spirally wound pressurized dough containers. In spite of the fact that it was public knowledge that dry-bond containers were known to be stronger than the containers made with aqueous glue, it was decided to construct and test "no-peel" type dough containers using a dry-bond adhesive such as heat sealing polyethylene to bond the layers together. As would be expected, these containers in which heat sealing polyethylene was used as the bonding agent were found to be strong in axial compression and as strong or stronger in side compression and in ring tensile strength than those previously made with aqueous glue; however, these containers, when filled with pre-leavened dough in the usual manner, opened considerably easier in response to moderate indenting force and the opening characteristics were more predictable than any of the "no-peel" type containers which we previously had made and tested. This would not have been expected in view of the generally higher strength characteristics of these containers.

In analyzing the reasons for the improved opening properties experienced with the dry-bond construction the following facts were determined. The paper industry conventionally supplies paper board to its customers in the fiber can business with a moisture content of approximately 5 to 8 percent. The water-base glue normally adds 2 to 3 percent moisture to the paper so that the fiber bodies of the foil lined and foil labeled containers usually contain approximately 7 to 8½ percent moisture and this percentage will be substantially maintained throughout the shelf life of the packed containers.

The laminated body system of the dry-bond container is relatively free from moisture and is therefore substantially stiffer than the laminated systems which have previously been used. Following this analysis, tests were run on containers constructed in the usual way with water-base glue. These containers were subjected to heat to eliminate the moisture from the system and it was discovered that these containers had approximately the same body wall stiffness and opened substantially as easily as containers manufactured with dry-bond adhesive. This experiment indicates that the moisture content and the stiffness of the body system are important factors in producing the desired opening characteristics of the "no-peel" container.

For purposes of this application dry-bond adhesives are defined as being any non-aqueous adhesives which will bond the layers together without softening the body layer when the containers are wound.

It is important in producing a pressurized dough container which has the desired and predicatable opening characteristics that the container wall be formed from a single ply of spirally wound body stock having a full length rupture line formed by a pair of adjacent separate shearing edges of the body stock. These edges are held together by the barrier layers formed by the one-piece inner liner and the one-piece outer label which respectively cover the complete inner and outer surfaces of the body ply and are adhered thereto by means of a dry-bond type of adhesive. The use of a dry-bond adhesive along with moisture impervious liner and label layers prevents moisture from the dough product and outside humid air from reaching the body layer surfaces and permits the relatively low moisture content of the body stock board to be maintained until the package is to be opened, at which time said moisture content is critical to the opening characteristics. The stiff shearing edges of the spirally wound body stock combine with the liner and the label to produce the desired opening characteristics of the container at the rupture line and permit the use of liner and label materials of sufficient strength to hold the pressurized dough product until the container is to be opened.

We have perfected an improved and acceptable one-step method for opening pressurized dough containers and also a new container which permits said method to be successfully carried out.

It is an important object of this invention to provide an improved one-step method for opening a pressurized dough package without any pre-weakening of the package consisting in the application of a moderate indenting force applied against the container side wall in substantial registration with a rupture line provided therein, the required rupturing force being not substantially greater than the indenting force required to open a pre-weakened "peel-open" type container.

Another object of this invention is to provide a "no-peel" spirally wound laminated container for pressurized dough products, which is sufficiently strong to withstand the pressure of the product therewithin but which can be easily opened without any pre-weakening whatever, by moderate indenting force against a selected area of the side wall which will cause the container wall to rupture along a pre-determined rupture line and permit easy removal of the pressurized dough.

It is a specific object of this invention to provide a "no-peel" type laminated dough container which has a spirally wound main body layer with the adjacent separate edges thereof disposed in edge-to-edge abutted relation to provide a rupture line extending the full length of the container, said rupture line being held together by means of inner and outer layers respectively covering the inner and outer surfaces of said main body layer and laminated thereto by means of a dry-bond adhesive, said body layer having sufficient stiffness to provide shearing edges to produce rupture at said rupture line upon moderate indenting force being applied to the side wall of the container in substantial registration with said rupture line.

Another specific object is to provide an easy opening package including a "no-peel" type composite container which contains a pressurized dough product and which container is formed from a plurality of spirally wound layers of sheet material including a layer of stiff fibrous intermediate body stock board which provides a spirally extending weakened rupture line which is held together by inner and outer barrier layers covering the respective inner and outer body surfaces and adhered thereto by means of a dry-bond type adhesive which produces and maintains the desired moisture content and stiffness in the fibrous material of the container, both of said barrier layers being ruptured upon application of a moderate indenting force at said spiral rupture line, such as is produced by moderate impact against a straight edge or by moderate thumb pressure, to release the pressure of said dough product and permit easy removal thereof from the container.

These and other objects and advantages will more fully appear in the following description made in connection with the accompanying drawings wherein like reference characters refer to the same or similar parts throughout the several views, and in which:

FIG. 1 is an elevational view of a container embodying this invention having parts thereof broken away;

FIG. 2 is a transverse sectional view drawn to a slightly larger scale than FIG. 1;

FIG. 3 is a perspective view showing a package embodying this invention being struck on the straight edge of a table;

FIG. 4 is a sectional view through the laminated body structure as it appears before impact; and FIGS. 5a – 5d are fragmentary sectional views showing progressively the rupturing action produced by impact of the container wall against a straight edge.

CONSTRUCTION OF CONTAINER

In the form of the invention illustrated in the accompanying drawings we provide a composite container C having a laminated spirally wound tubular body wall 10 with a pair of metal ends 11 crimped or seamed thereon. The container in the form shown is filled with a pressurized dough product such as pre-leavened dough D. The container C and the dough D therein combine to form a pressurized dough package which in accordance with conventional marketing practice is maintained under refrigeration until used.

In the dough container C the liner 12 is made from a suitable barrier material which can be easily ruptured and which upon being ruptured will tear from end to end of the container under the pressure of the dough. Aluminum foil laminated to paper has been found to be a suitable liner material. As shown in FIG. 4, the foil is designated 12b and the paper laminated to the foil is designated 12c. The body layer 13 is made from fibrous paper board stock material that is classified as being stiff in the paper making industry, such as kraft board. The label 14 should be a good moisture barrier material which can be easily ruptured and will then tear quickly from end to end of the container under the pressure of the dough. Aluminum foil laminated to kraft paper has been found to be a suitable label material. The foil is designated 14b and the paper is designated 14c, as shown in FIG. 4.

In the form shown the three layers 12, 13 and 14 are all spirally wound. The edges of the body 13 are butted together to form shearing edges which provide a rupture line or butt joint 13a. The adjacent marginal edges of the liner 12 are overlapped as 12a and the inner edge is folded under as shown in FIG. 2. The edges of the label 14 are also overlapped as shown at 14a. The rupture line 13a is out of register with the liner and label joints 12a and 14a. The inner and outer layers 12 and 14 bridge the rupture line 13a to reinforce and hold the same together until the container is opened.

We have found that using a dry-bond type adhesive (compared with an aqueous type glue previously used) greatly improves the opening characteristics of the container while at the same time increasing the strength of the body wall. We have also found that the bond obtained between the respective adhered surfaces of the liner and body board and between the label and body board, is more uniform than the bond obtained with the water-base glue and the adhesion is particularly improved along the marginal portions adjacent the butt joint or rupture line 13a. We have found that low-density polyethylene is a suitable dry-bond adhesive and has proved to be satisfactory for securely bonding the three layers of the container C together. However, any adhesives will work satisfactorily which do not soften the body layer 13 when the containers are wound. In the particular form illustrated both sides of the body board 13 have been coated with polyethylene as identified in FIG. 4 by the numerals 13b and 13c. At the present time this appears to be the most efficient method of providing the dry-bond adhesive since both sides can be coated in a single pass operation. It also appears that coating both sides of the board helps to maintain a substantially uniform moisture content in the board which is less affected by moisture after the containers are manufactured and packed with dough. The manufactured tubing is cut into containers of the desired length and one of the container ends is closed at the time the containers are manufactured by suitable means such as the metal end closure 11 secured to the end of the container as by being seamed thereon.

We have found that the most efficient and economical container construction which has both the required strength and opening characteristics is a spirally-wound laminated container structure in which the rupture line 13a of the body layer 13 is provided by the butt joint formed at the time of winding. This construction also includes complete liner and label layers respectively covering the entire inside and outside surfaces of the body layer, without including any narrow strips or tapes which only partially cover the surface of the layer to which they are applied. It is a possibility that suitable barrier means could be provided for preventing the moisture and oils in the dough from damaging the strength or appearance of the container and, if so, the strengthening function of the liner layer could be eliminated and the reinforcing function could be provided solely by the outer label. It is also a possibility that the outer label layer could be eliminated by providing suitable outer barrier means and the reinforcing function would then be provided solely by the inner liner.

The containers with one end on are normally filled by automatic packing machinery which receives the containers from a conveyor line and inserts the biscuits into the open end of the containers and thereafter the other end is closed as by a metal end 12 seamed thereon.

CRITICAL MANUFACTURING PROBLEMS

In the manufacture of spiral composite containers one very important factor which contributes to the strength of the containers is a uniformly tight edge-to-edge relation at the butt joint of the body stock board. There are several manufacturing problems in making a tight edge-to-edge butt joint; e.g. the accurate slitting of the board stock, positive control of the winding angle, control of the tension on the strip of board being wound, etc. If the butt joint is not maintained in tight edge-to-edge relation during the winding operation this produces an "open butt" which materially weakens the can body and makes the same considerably more susceptible to damage during the seaming and packing operations. In order to provide the required opening characteristics and permit easy opening of the container, the strength of the liner 12 and the label 14 which hold the body layer 13 together is critical and must be limited so that it is not too strong or too weak. A container with a spiral wound butt joint must rely solely on the label and liner to resist any resultant compressive as well as twisting forces applied to the container as by seaming and packing machinery. Since the liner and label materials used have very little compressive strength they will yield and wrinkle under compression (with an open butt joint 13a) until the body material shifts sufficiently to bring the spiral edges together and close the butt joint. Such wrinkling and creasing weakens the liner and label material to such an extent that it will frequently fail when ultimately subjected to the tension produced by the pressure of the dough when the containers are filled. If, however, the butt joint can be maintained in tight edge-to-edge relation the container will be materially stronger since the abutted edges will support a compressive load without permitting any appreciable shifting of the edges of the board, thus preventing creasing of the liner and label.

THE OPENING OPERATION

Containers made in accordance with this invention and packed with a semisolid pressurized product such as pre-leavened dough, can be easily opened by merely striking a pre-determined area of the side wall of the container on the straight edge of a kitchen counter or table as has become customary with present "peel-open" containers after pre-weakening. This area is in substantial registration with the underlying rupture line 13a and would be indicated on the outside of the label 14. The force of the blow required to open this "no-peel" container is not significantly greater than the force required to open the former "peel-open" containers with the wrapper removed. When the filled container is struck on the table edge at the pre-determined indicated area as indicated above, the side wall is indented at the butt joint. This causes the shearing edges of the relatively stiff body stock to rupture the liner 12 and label 14. The pressure of the dough then causes the container to immediately break open along the full length of the rupture line 13a to quickly release the dough pressure and prevent extrusion and permit easy removal of the dough. The side wall of the container can also be indented by inwardly directed finger or thumb pressure and the container may be opened in this manner if desired. While it is difficult to determine exactly how the indentation operates to produce the initial rupture, it is believed that this local area of indentation will produce a spreading apart of the edges of the body stock at the indented portion of the rupture line 13a and that this spreading apart of the rupture line at this point will produce initial breaking of the liner 12 at the area of indentation at the butt joint. This initial breaking of the liner 12 is apparently followed immediately by rupture of the label 14 in this area. As has previously been stated, the strength of the container will be determined at least in part by the strength of the liner 12 and the outer label 14 which serve to hold the butt joint together. It will also be apparent that increasing the strength of the liner and label will make the container harder to open so that we are confronted with the same problem previously described herein. Eliminating moisture in the container through the use of a dry-bond type adhesive permits the container to be opened much easier without decreasing the strength of the liner and label material.

We have made a number of comparative tests to determine the respective properties of the aqueous glued container construction compared with the dry-bond container construction. The aqueous glued containers will be referred to in this application as "glued" containers. These tests include ease of opening tests which indicate the opening characteristics of the respective containers and also include comparative strength tests, moisture content determination and comparative board stiffness tests. It should be kept in mind in evaluating this test information that the "glued" container construction which was used to make the "no-peel" containers covered by U.S. Pat. No. 2,975,068 identified on page 1 of this specification proved to be of sufficient strength to stand up satisfactorily in the market so that the strength tests of these "no-peel" "glued" containers have formed a test control or guide for indicating the strength required for the dry-bond containers. As has been stated, however, the "glued" "no-peel" type containers required impact on a protruding corner in order to open easily. As stated, this was objectionable. If not struck on a protruding corner they were too difficult to open to be accepted by the consumer. The control or guide for the ease of opening on a straight edge as distinguished from a protruding corner has been the "peel-open" container from which the label has been removed. When the label has been removed only the glued-in liner resists the pressure of the dough confined therein. As has been stated, these "peel-open" containers are exemplified generally by U.S. Pat. Nos. 2,793,126; 2,793,127 and 3,144,193. The constant endeavor in developing the present "no-peel" container construction has been to make a container with the strength characteristics of the "glued" "no-peel" container, but having the opening characteristics of the "peel-open" container with the outer wrapper removed. The "dry-bond" container construction is stronger in end-to-end compression than the "glued" container construction and is at least as strong in ring tensile strength and in side wall crush strength. We have determined that the moisture content of the entire laminated can system for the "glued" container construction is between 7 and 8 percent. We have also determined that the moisture content of the dry-bond laminated can system is between 3 and 4 percent and in most instances is approximately 3½ percent. All of these tests, of course, were run with identical materials with the exception that the paper board body material used in the dry-bond containers was coated on both sides with the dry-bonding agent prior to winding on the can winder. Our comparative stiffness tests indicate that the dry-bond board containing between 3 and 4 percent moisture is substantially stiffer than a similar board containing between 7 and 8 percent moisture. As previously stated, the paper board body stock has between 5 and 6 percent moisture when it is received from the mills, whether it is coated with dry-bond adhesive or is uncoated.

The opening characteristics of our new dry-bond "no-peel" container are generally similar to the opening characteristics of the "peel-open" type container after the body has been pre-weakened. The opening tests that we have performed indicate that the prior "glued" "no-peel" container requires a great deal more indenting force to produce the rupture of the side wall than is required with the "peel-open" containers with the outer label removed. These same tests indicate only a slight increase in the force required for opening the new dry-bond "no-peel" container over the force required to open the "peel-open" type container which has had the outer label removed.

It will be seen that we have provided an improved one-step method for opening pressurized dough containers which consists in applying a moderate indenting force against a selected area of the side wall of the dough filled package, as by moderate impact against a straight edge of a table or kitchen counter or by thumb pressure against said side wall to cause rupture of the container side wall along a pre-determined spiral rupture line extending the full length of the container to permit easy removal of the dough from the container. We have also provided a novel pressurized dough container specifically constructed to permit easy opening thereof without any pre-weakening of the container wall.

What is claimed is:

1. An easy one-step opening "no-peel" type spirally wound container particularly designed for packaging pressurized dough products, said container comprising:

A. a spirally would laminated body wall construction including an intermediate stiff body layer made from fibrous board material with the moisture content thereof being between 3 and 4 percent to produce the required stiffness in said body layer,
1. said body layer having a pair of separate adjacent edges butted together to form shearing edges which define a spirally disposed rupture line extending the full length of the container,
B. inner and outer barrier layers,
1. respectively covering the entire inner and outer surfaces of said body and bridging said rupture line and
2. permanently laminated to said body surfaces,
3. said barrier layers being of a moisture-impervious material
   a. to combine with the body layer to hold the dough product until the container is opened.
   b. to provide barrier properties to substantially isolate said body layer from contact with the product confined within the container and from the moisture of the ambient air to prevent absorption by said body layer and maintain sufficient body wall stiffness to produce the desired predictable opening characteristics which permit rupture at said rupture line by striking with moderate indenting force a predetermined area of said body wall against the straight edge of a kitchen counter or the like,
C. and means for closing the ends of the container.

2. The container set forth in claim 1 and said barrier layers being laminated to the respective surfaces of said body layer by means of a dry-bond type adhesive.

3. An easy one-step opening "no-peel" type spirally wound container particularly designed for packaging pressurized dough products, said container comprising:
A. a spirally wound laminated body wall construction including a stiff body layer made from fibrous board material with the moisture content thereof being between 3 and 4 percent to produce the required stiffness in said body layer,
1. said body layer having a pair of separate adjacent edges butted together to form shearing edges which provide a spirally disposed rupture line extending the full length of the container,
B. moisture-impervious barrier means covering the entire inner and outer surfaces of said body layer to substantially isolate said body layer from contact with the product confined within the container and from the moisture of the ambient air to prevent absorption by said body layer and maintain sufficient body wall stiffness to produce the desired predictable opening characteristics,
C. at least one reinforcing layer permanently laminated to said body layer between said body layer and at least one of said barrier means, said reinforcing layer bridging said rupture line and being of a dry-bond adhesive material
1. to combine with said body layer to hold the dough product until the container is opened, and
2. to rupture along said rupture line upon impact produced by striking with a moderate indenting force a predetermined area of said body wall against the straight edge of a kitchen counter or the like,
D. and means for closing the ends of the container.

* * * * *